United States Patent [19]

Carey

[11] 4,077,148

[45] Mar. 7, 1978

[54] FISHING ROD HOLDER

[76] Inventor: Jesse Carey, 2014 N. Keen Ave., Los Angeles, Calif. 90059

[21] Appl. No.: 697,046

[22] Filed: Jun. 17, 1976

[51] Int. Cl.² .................... A01K 97/10; A01K 97/12
[52] U.S. Cl. .................................................... 43/16
[58] Field of Search ............................ 43/15, 16, 17

[56] References Cited

U.S. PATENT DOCUMENTS

| | | | |
|---|---|---|---|
| 2,784,517 | 3/1957 | Mooney | 43/16 |
| 2,995,824 | 8/1961 | Faycosh | 43/16 |

Primary Examiner—Jay N. Eskovitz
Assistant Examiner—Robert P. Swiatek
Attorney, Agent, or Firm—Dominick Nardelli

[57] ABSTRACT

A fishing rod holder has a pointed post capable of being pushed into the ground, and pivotable member pivotably mounted on the upper end of the post. This member is designed to hold and support the handle of a fishing rod. A spring is provided co-acting between the member and the post to cause the member, when not restrained, to raise the forward end of the fishing rod. Protruding horizontally from the post is a structure which slidably supports an elongated sear. Another spring is provided to urge the sear toward the post. Depending from the forward end of the pivotable member is a keeper having a hole at its lower end. The purpose of the hole is to be engaged by the sear when the sear is in an extended position. The first mentioned spring provides a friction force between the sear and its support structure which force is sufficient to prevent the second mentioned spring from urging or retracting the sear towards the post. An electrical switch is provided between the post and the sear so that when the sear is retracted the switch is closed to activate a signal, such as a light or buzzer.

8 Claims, 4 Drawing Figures

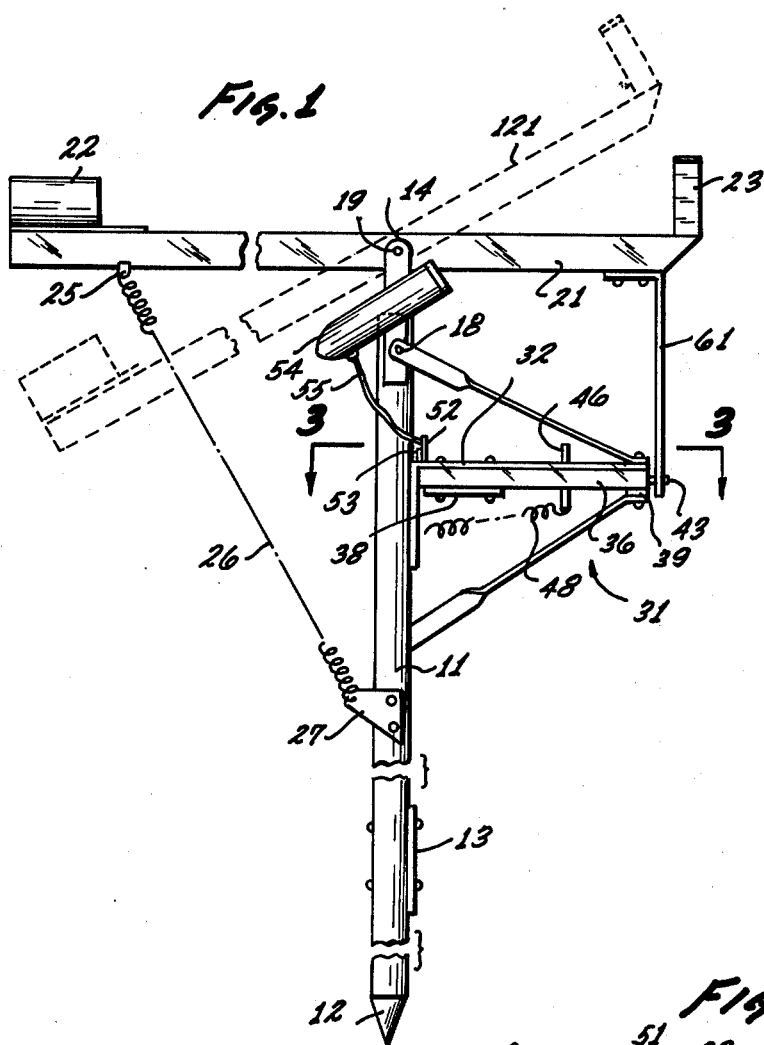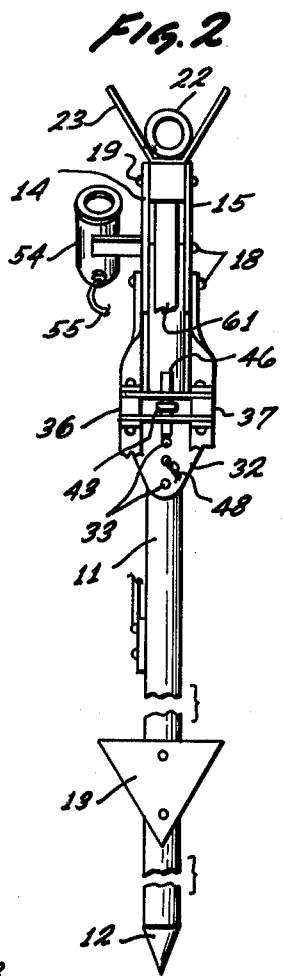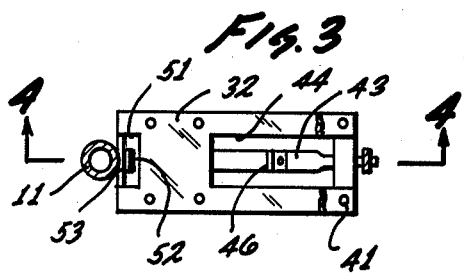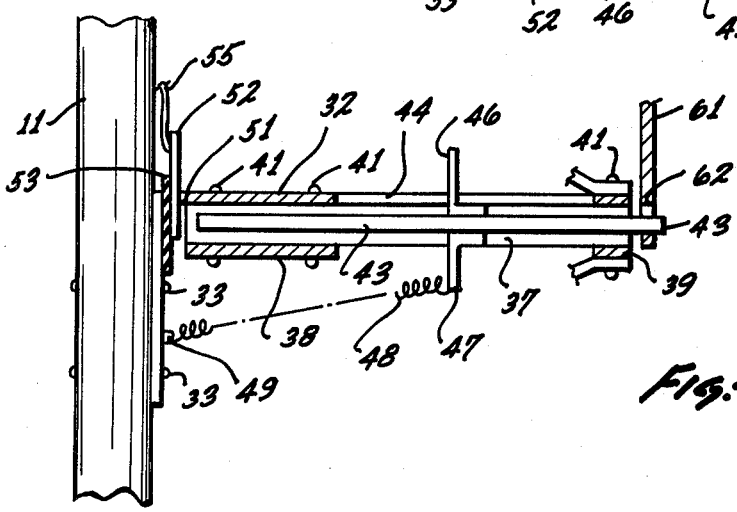

FISHING ROD HOLDER

FIELD OF THE INVENTION

This invention relates generally to fishing equipment and, more particularly, to an improved fishing rod holder.

BACKGROUND OF THE INVENTION

Up to now, fishing rod holders have been subjected to one or more significant disadvantages. In some, the cocking involves a time-consuming and complicated operation. In others, the insertion of the rod and the arrangement of the device for tripping takes a relatively long time. Also, if one desires to place a visible or audible signal to indicate tripping on the device, considerable changes would be required.

OBJECTS OF THE INVENTION

An object of this invention is to provide an efficient fishing rod holder that is economical and simple.

Another object of this invention is to provide a self-cocking fishing rod holder which can be quickly and easily made ready for use.

Another object of this invention is to provide a fishing rod holder that can be readily adapted with an audible or visible signaling device.

These and other objects and features of advantage will become more apparent after studying the following detailed description of the preferred embodiment of my invention, together with the appended drawing.

BRIEF DESCRIPTION OF THE DRAWING

FIG. 1 is a side elevation of my novel device.

FIG. 2 is a right hand view of the device in FIG. 1.

FIG. 3 is a partial view, taken on line 3—3 of FIG. 1, in the direction of the arrows.

FIG. 4 is an enlarged elevation section, taken on line 4—4 of FIG. 3, in the direction of the arrows.

DETAILED DESCRIPTION OF THE DRAWING

Referring to the drawing, my novel fishing rod holder is supported by a support member or post 11, made preferably of a metal tube and formed with a point 12 at the lower end so that the post 11 can be stuck into the ground. A triangular plate 13 aids one to penetrate the ground with the post by allowing a foot rest. After plate 13 is buried into the ground the relatively broad area offers increased resistance in the direction that the caught fish would pull. The upper end of the post 11 is provided with a pair of bars 14 and 15 suitably riveted on opposite sides of the post by rivets 18. At the upper end of the bars 14 and 15 is disposed a pin 19 which pivotably supports a pivotable member or fishing rod retainer 21 which is also preferably metallic. For reasons that will become apparent hereinafter, pin 19 is disposed parallel to plate 13. The pivotable member 21 is provided at its aft end with a suitable cup 22 into which the end of the handle of a fishing rod (not shown) can be placed. A U-shaped member 23 at its opposite or forward end is positioned to cradle the fishing rod. Below the cup 22 is placed an eye 25 to which is attached one end of a tension spring 26 which has its other end attached to an eye 27 on the post 11. The purpose of this spring 26 is to hold the pivotable member 21 in the position shown by dash lines 121 in FIG. 1.

A suitable distance from pin 19 is a means 31 which holds the member 21 in substantially the position as shown by solid lines against the action of spring 26. The means 31 has a metallic angle bracket 32 suitably riveted to post 11 by rivets 33. Below bracket 32 is disposed a pair of spacer bars 36 and 37 and thereto a pair of transverse straps 38 and 39 (FIG. 4) suitably riveted by rivets 41 to form an elongated space that is substantially enclosed. Within this space is slidably disposed an elongated sear 43. The bracket 32 is provided with an opening 44 to accommodate a handle 46 on the sear. Below the handle 46 is placed an eye 47 to which is attached one end of another tension spring 48 which has its other end attached to an eye 49 formed on bracket 32. The bracket 32 has another opening 51 formed near the post 11. Through opening 51 protrudes an electrical terminal 52 which is fastened to bracket 32 in electrical insulating relationship by an insulator means 53. The terminal 52 is coupled to an electrical device such as a flashlight 54 by a wire 55. The case of the flashlight 54 is grounded to the post. To complete the means 31 a keeper means in the form of an angle bracket 61 is depending from and suitable riveted to the forward end of member 21. The bracket 61 has a hole 62 which is engaged by the sear 43.

My novel fishing rod holder is operated as follows: First the post is secured and in the described embodiment by penetrating the post 11 into the ground. One understands that a suitable clamp can be used if one is fishing from a boat, pier, etc. The forward end of member 21 is pivotable downward and when the opening 62 in bracket 61 is aligned with the sear 43, the sear is moved against the action of spring 48 and into the opening 62. The member 21 is released while still holding onto the sear 43 in its extended position. When the full force of the spring 26 is acting on member 21, the forward end of sear 43 is raised upward causing the sear to bind. Therefore it cannot be acted on by spring 48. The fishing pole (not shown) is now placed on the member 21 with the handle in cup 22 and cradled in strap 23. When a fish bites the hook and pulls, member 21 will pivot downward causing the sear 43 to become free. Then spring 48 retracts the sear. When it is fully retracted it makes contact with terminal 52 to complete the circuit, causing the flashlight to glow. Spring 26 pivots the fishing rod upward to secure the fish.

Having described one embodiment of my invention, others skilled in the art, after studying the above detailed description of my preferred embodiment, can devise other embodiments without departing from the spirit of my invention. Therefore my invention is not to be considered as limited to the described embodiment, but includes all embodiments falling within the scope of the appended claims.

I claim:

1. A fishing rod holder comprising:
   a support member;
   a fishing rod retainer pivotably mounted on said support member so that said retainer pivots substantially about a horizontal axis when in normal use;
   a first spring normally disposed to act between said retainer and said support member to urge said retainer in one direction or rotation with respect to said member;
   a means on said support member for cocking said retainer so that said first spring is under energy storage conditon;
   said means having a slidable sear for engaging said retainer when in its cocked position;

a second spring disposed to act between said sear and said support member to retract said sear when said retainer is not in a cocked position; and an electrical terminal electrically insulated and mounted on said means and disposed to have said sear make contact therewith when said retainer is not in a cocked position.

said means further comprises;

an elongated bracket fixed to said member and extending horizontally therefrom;

a pair of bars fixed along side of said bracket in spaced parallel relationship to each other;

a pair of straps each fixed to both of said bars to define an elongated horizontal opening;

said sear slidably disposed with said horizontal opening;

a depending bracket fixed at one end of said retainer to extend towards said sear; and said depending bracket having an aperture for engaging said sear.

2. The rod holder of claim 1 wherein:

a plate is fixed to said support member adjacent to an end remote from said retainer;

said support member is provided with a point at said remote end;

a pivot pin is disposed at the other end of said member which end supports said rod retainer;

said rod retainer is pivotably mounted on said pin; and said pin is disposed parallel to said plate.

3. The rod holder of claim 1 wherein:

said elongated bracket has an opening formed therein and disposed between said support member and said sear;

said electrical terminal is disposed within said opening and in electrical insulating relationship with said bracket and said support member.

4. The rod holder of claim 3 wherein:

a plate is fixed to said support member adjacent to an end remote from said retainer;

said support member is provided with a point at said remote end;

a pivot pin is disposed at the other end of said member which end supports said rod retainer;

said rod retainer is pivotably mounted on said pin; and said pin is disposed parallel to said plate.

5. The rod holder of claim 3 wherein:

said first spring is a tension spring and is disposed to act between said support member and the end of said rod holder removed from said depending bracket.

6. The rod holder of claim 5 wherein:

a plate is fixed to said support member adjacent to an end remote from said retainer;

said support member is provided with a point at said remote end;

a pivot pin is disposed at the other end of said member which end supports said rod retainer;

said rod retainer is pivotably mounted on said pin; and said pin is disposed parallel to said plate.

7. The rod holder of claim 5 wherein:

an electrical lead is provided to couple said terminal to a flashlight so that said flashlight illuminates when said sear makes contract with said terminal.

8. The rod holder of claim 7 wherein:

a plate is fixed to said support member adjacent to an end remote from said retainer;

said support member is provided with a point at said remote end;

a pivot pin is disposed at the other end of said member which end supports said rod retainer;

said rod retainer is pivotably mounted on said pin; and said pin is disposed parallel to said plate.

* * * * *